(12) United States Patent
Sernik

(10) Patent No.: US 9,927,526 B2
(45) Date of Patent: Mar. 27, 2018

(54) SYSTEMS AND METHODS FOR POSITION DETERMINATION IN GPS-DENIED SITUATIONS

(71) Applicant: ELBIT SYSTEMS OF AMERICA, LLC, Fort Worth, TX (US)

(72) Inventor: Enrique Sernik, Merrimack, NH (US)

(73) Assignee: Elbit Systems of America, LLC, Fort Worth, TX (US)

(*) Notice: Subject to any disclaimer, the term of this patent is extended or adjusted under 35 U.S.C. 154(b) by 667 days.

(21) Appl. No.: 14/495,617

(22) Filed: Sep. 24, 2014

(65) Prior Publication Data

US 2015/0084812 A1    Mar. 26, 2015

Related U.S. Application Data

(60) Provisional application No. 61/881,867, filed on Sep. 24, 2013.

(51) Int. Cl.

| | |
|---|---|
| *G01S 19/06* | (2010.01) |
| *G01S 19/21* | (2010.01) |
| *G01S 19/47* | (2010.01) |
| *G01S 19/48* | (2010.01) |
| *G01S 19/49* | (2010.01) |
| *G01S 19/45* | (2010.01) |

(52) U.S. Cl.
CPC ............ *G01S 19/215* (2013.01); *G01S 19/06* (2013.01); *G01S 19/21* (2013.01); *G01S 19/47* (2013.01); *G01S 19/45* (2013.01); *G01S 19/48* (2013.01); *G01S 19/49* (2013.01)

(58) Field of Classification Search
CPC ........ G01S 19/215; G01S 19/47; G01S 19/06; G01S 19/48; G01S 19/45; G01S 19/46; G01S 19/49; G01S 19/252; G01S 19/26; G01S 19/21; G01S 5/0263; G01C 21/165; G01C 21/28
USPC .......... 342/357.28–357.32, 357.43; 701/472, 701/474, 500

See application file for complete search history.

(56) References Cited

U.S. PATENT DOCUMENTS

| | | | | |
|---|---|---|---|---|
| 5,557,284 | A * | 9/1996 | Hartman ............... | G01S 19/215 342/352 |
| 5,923,286 | A * | 7/1999 | Divakaruni ........... | G01C 21/165 342/357.44 |
| 7,133,772 | B2 * | 11/2006 | van Diggelen ....... | G01S 5/0036 342/357.42 |
| 7,436,355 | B2 * | 10/2008 | Nicholson ............. | G01S 19/20 342/357.58 |
| 2012/0105271 | A1 * | 5/2012 | Watanabe ............. | G01S 19/47 342/147 |
| 2013/0314277 | A1 * | 11/2013 | Cheng .................... | G01S 19/42 342/357.26 |
| 2014/0070986 | A1 * | 3/2014 | Gao ....................... | G01C 21/165 342/357.3 |

* cited by examiner

*Primary Examiner* — Chuong P Nguyen
(74) *Attorney, Agent, or Firm* — Conley Rose PC

(57) ABSTRACT

A method for calculating a position of a receiver. The method includes determining a first position of the receiver at a first time using data from satellites and determining a second position of the receiver at a second time using the first position and data from a non-satellite sensor. The method also includes calculating the positions of the satellites at the second time and comparing, for each satellite, the calculated position with a known position at the second time.

13 Claims, 3 Drawing Sheets

SYSTEMS AND METHODS FOR POSITION DETERMINATION IN GPS-DENIED SITUATIONS

CROSS-REFERENCE TO RELATED APPLICATIONS

The present application claims priority to U.S. Provisional Patent Application No. 61/881,867 filed on Sep. 24, 2013, which is hereby incorporated herein by reference.

BACKGROUND

Satellite navigation systems such as the Global Positioning System (GPS) can be used by receivers configured to receive satellite signal(s) to determine receiver location with a high degree of accuracy. Some receivers are equipped with supplemental sensors that provide inputs that are used in conjunction with satellite signals to improve the functionality of the receiver.

GPS availability has limitations that have become more noticeable as the range of GPS applications has increased. Many applications require uninterrupted (GPS) service regardless of whether the user is in an urban area, or in a mountain zone, under a tunnel, or in a bunker. Additionally, in recent years, jamming tactics affecting GPS devices are increasing, decreasing GPS availability and thus system accuracy even further.

In these cases, the GPS signal tends to either disappear completely or simply become intermittent, disrupting the navigation ability of the device. GPS signals may be supplemented with information from other sensor(s), such as inertial measurement units (IMUs), laser range-finders, or cameras, but also magnetic compasses, altimeters, speedometers, star trackers, and the like. This allows navigation to continue once the GPS-denied situation develops. However, the additional information from sensors only provides the required accuracy for a short period of time compared to when GPS is available. Further, additional sensors add to the size, weight, and power consumption of the device and are more costly to manufacture.

BRIEF DESCRIPTION OF THE DRAWINGS

For a detailed description of exemplary embodiments, reference will now be made, by way of example only, to the accompanying drawings in which.

NOTATION AND NOMENCLATURE

Figure 1:
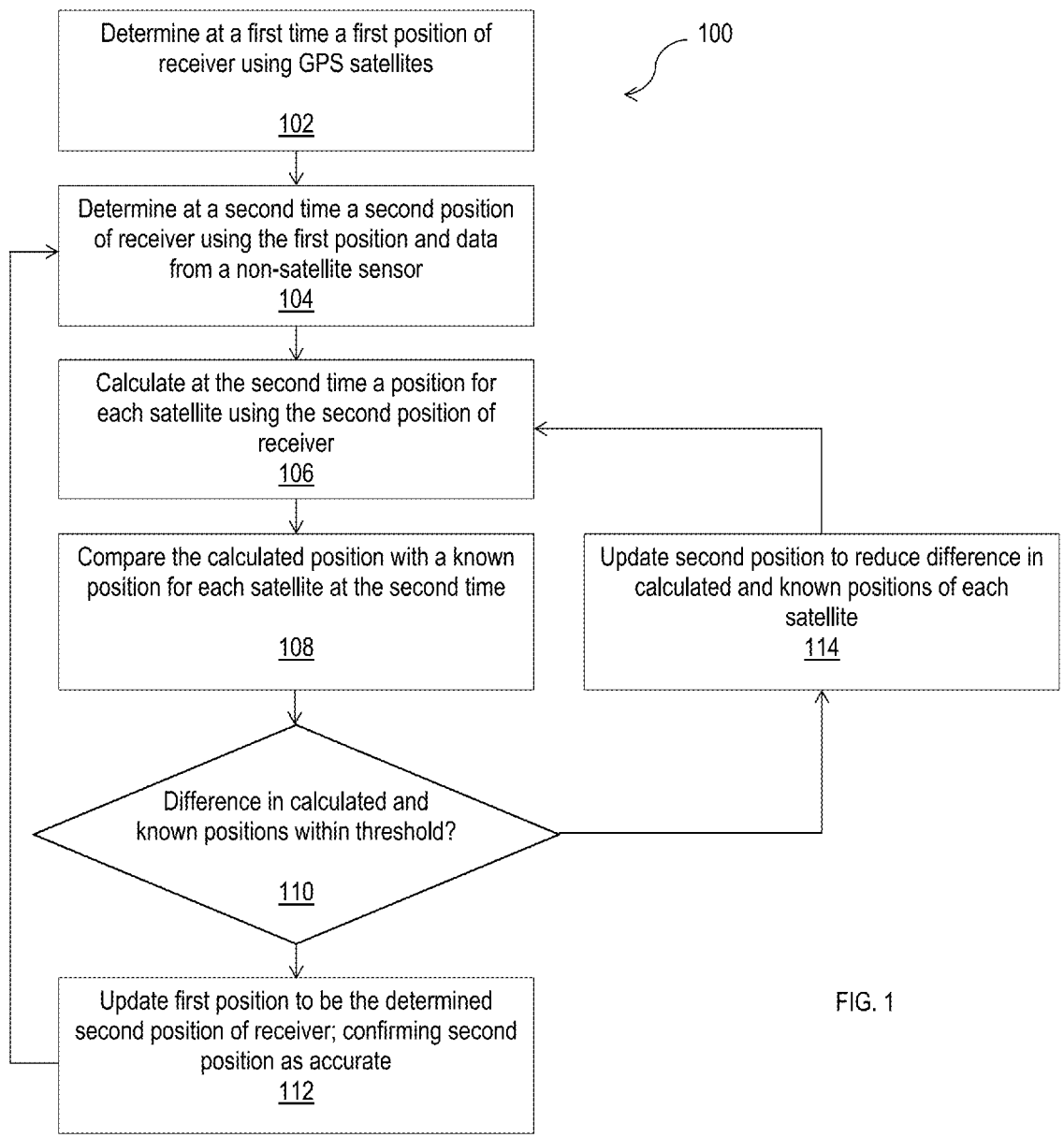
FIG. 1 shows a flow chart of a method in accordance with at least some embodiments of the present disclosure.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

As used herein, the term "GPS-denied" refers to a scenario in which a GPS receiver is not able to ascertain its position due to a lack of available GPS signals from GPS satellites.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

The present disclosure relates to systems and methods that provide information regarding position, velocity, and attitude for navigation purposes in global positioning system (GPS)-denied environments, regardless of whether the GPS-denied environment is man or nature created or whether the GPS-denied environment is caused intentionally or not. Embodiments are of the present disclosure are directed to systems and methods for satellite, assisted satellite, and electronic navigation systems. This disclosure provides GPS-like position determination in a GPS-denied scenario, allowing a system to maintain or extend in-spec operation for the duration of the GPS-denied scenario.

The availability of the Global Positioning System (GPS) continues to improve the progress of navigation systems. GPS provides positioning accuracies on the order of 10 meters or less, which are used as the upper limit in positioning system design specifications. New systems, which combine GPS receivers with other technologies such as image sensors, inertial measurement units (IMUs), laser sensors, fiber-optic gyroscopes, magnetometers, and the like, result in state-of-the-art devices for use in a variety of fields such as defense, automotive, medicine, personal digital assistants, telephony, and others.

As mentioned above, GPS availability has certain limitations that are more noticeable as the range of GPS applications has expanded. In normal operation, access to uninterrupted GPS service is utilized to provide accurate determination of a device's position. However, in certain scenarios, GPS signals tend to dissipate, either disappearing completely or becoming intermittent, which reduces the reliability of the GPS receiver and disrupting the navigation application. Examples of scenarios in which GPS signals are unavailable or intermittent—so-called GPS-denied situations or scenarios—are when the receiver is positioned in dense urban areas where buildings may cause interference, under a tunnel, under water, in a protected bunker, or where weather patterns may unacceptably degrade or inhibit the reception of GPS signals. Other GPS-denied scenarios are contemplated, but the above list is exemplary.

Existing solutions that address GPS-denied situations rely on devices combining GPS information with information provided by one or more additional sensors, such as electro-optic devices (IMUs, laser range-finders, or cameras), magnetic compasses, altimeters, speedometers, star trackers, or other sensor devices in an effort to provide a seamless user experience and/or transition within a navigation application, receiver, or other device. That is, positional determinations during the GPS-denied scenario are made using computations relying on information provided by the additional sensor(s) for the duration of the GPS-denied event.

Certain solutions such as those utilizing IMUs are only capable of maintaining positional accuracy during GPS-denied scenarios for short periods of time, after which positional accuracy begins to degrade as compared to the accuracy obtainable using GPS satellite signals. Other solutions such as those utilizing celestial trackers are limited by nature as in the case of a cloudy night). Further, to the extent additional sensors are incorporated into devices/receivers, they typically result in added size, weight, and power requirements. Finally, additional sensors also result in more complex and more expensive designs.

As will be described in further detail below, systems and methods are provided that address these problems in GPS-denied scenarios. The systems and methods leverage available GPS systems, existing supplemental sensor data within the system or application, as well as filtering techniques, in order to provide GPS-like service. The provision of GPS-like navigation ability is available for longer periods of time than those provided by current supplemental sensors. Further, no increase in size, weight, or power consumption is experienced. Still further, the systems and methods described below can increase resistance to GPS jamming tactics, and may be implemented in real-time. In addition, in certain embodiments of this disclosure, the systems and methods provide an early warning capability should the real GPS signal be spoofed and/or blocked before the GPS-denied environment develops, Embodiments of the present disclosure comprise systems and methods for addressing GPS-denied situations. Certain embodiments improve positional accuracy for longer periods of time than existing solutions without increasing size, weight, or power requirements. Some embodiments of the present disclosure rely upon knowledge of the position of satellites generating GPS signals as well as on navigation estimation algorithms.

Conventionally, a GPS receiver determines its position when GPS signals are available by solving the following equation:

$$PR+T=[(X-Xs)^2+(Y-Ys)^2+(Z-Zs)^2]^{1/2} \quad \text{Equation 1}$$

There are four unknowns in the above equation: X, Y and Z, which are the coordinates describing the receiver's 3-dimensional position and T, the receiver clock bias. The clock bias term is often expressed as a time variable for convenience; however, because it is understood that a GPS signal travels at the speed of light, the term T may be easily converted to distance. The quantities Xs, Ys, Zs represent the coordinates of the satellite position, which are known. As will be appreciated by one skilled in the art, tables of the trajectories (called ephemerides) of GPS satellites are available and can be used to derive satellite locations. GPS satellite positions may also be calculated accurately using two line element (TLE) data sets for a particular satellite. TLE datasets are also available online and allow the calculation of satellite ephemerides, that is, the satellites' position, for extended periods of time into the future. The quantity PR represents the approximate distance from the receiver to the satellite, also referred to as pseudo-range. The pseudo-range is calculated by the GPS receiver based on the length of time it takes the signal to travel from the satellite to the receiver's location and the fact that the signal travels at the speed of light. Although only one equation is provided above, one skilled in the art should appreciate that multiple satellites (e.g., four satellites) can be used to generate a system of four equations:

$$PR_1+T=[(X-Xs_1)^2+(Y-Ys_1)^2+(Z-Zs_1)^2]^{1/2}$$

$$PR_2+T=[(X-Xs_2)^2+(Y-Ys_2)^2+(Z-Zs_2)^2]^{1/2}$$

$$PR_3+T=[(X-Xs_3)^2+(Y-Ys_3)^2+(Z-Zs_3)^2]^{1/2}$$

$$PR_4+T=[(X-Xs_4)^2+(Y-Ys_4)^2+(Z-Zs_4)^2]^{1/2} \quad \text{Equations 1A}$$

Various sources of error exist in Equations 1 and system 1A, such as travel time of the signal sent by the satellites due to, for example, atmospheric conditions, to approximations that assume that all satellites and receiver have their time-clocks synchronized. Further, the aforementioned equations are not exact and so an exact solution is not usually found. Therefore, solving for the four unknowns mentioned above typically involves finding approximate solutions and iterating through solutions until one solution that fits a given set of requirements is obtained. In other words, solving for the four unknowns may be achieved when a solution that produces an "error" that is within the specifications of a particular device (or situation) is found. However, when GPS signals are no longer available, it is desired to improve the accuracy of position determination when employing non-satellite sensors, such as those described above.

Turning now to FIG. 1, a method 100 is shown in accordance with various embodiments. The method 100 may be used in accordance with the present disclosure for navigation in a GPS-denied scenario. The method 100 may generally be performed by any number of GPS devices including a GPS receiver and one or more additional non-GPS sensors (e.g., an IMU). For purposes of illustration, reference is made to the method 100 being carried out by a handheld, or man-portable device having an inertial navigation system (INS) with an IMU; however, one skilled in the art will appreciate that the disclosure is not limited to such devices and that many devices are contemplated within the scope of the present disclosure. Devices containing multiple navigation inputs as described above are also contemplated within the scope of the present disclosure. In some embodiments, a device may compute its position by combining data obtained from GPS satellites with information provided by the INS and using a filtering algorithm such as a Kalman filter as known in the art.

The method 100 beings in block 102 with determining a first position of a receiver using data from GPS satellites. The first position is determined at a first time or t0 as it is alternately referred to. The determination of a position using data from GPS satellites is known in the art and explained above. When the receiver enters a GPS-denied scenario, the method 100 continues in block 104 with determining a second position of the receiver using the first position and data from a non-satellite sensor. For example, where the sensor is an IMU, sensor data may be integrated to determine the positional change of the receiver, which can then be combined with the first, known position, to arrive at a second position. In other embodiments, a filtering algorithm (e.g., Kalman filter) is applied to determine the second position. As explained above, such positional determination provides an acceptable level of error over short periods of time; however, over longer periods of time, the error introduced by non-GPS sensors becomes unacceptable.

For purposes of the following disclosure, the following notation may be applied:

$PR_{i,t}$ (Pseudo Range) approx. distance from the receiver to satellite i at time t $PR^f_{i,t}$ (Pseudo Range) approx. distance from the receiver to satellite i calculated with the (e.g., Kalman) filter, at time t $SPos_{i,t}$ Satellite i Position coordinates at time t given by ($SX_{i,t}$, $SY_{i,t}$, $SZ_{i,t}$)

$SPos^f_{i,t}$ Satellite i Position coordinates calculated with the (e.g., Kalman) filter, at time t given by ($SX^f_{i,t}$, $SY^f_{i,t}$, $SZ^f_{i,t}$)

$T_t$ The receiver clock bias at time t $T^f_t$ The receiver clock bias calculated with the (e.g., Kalman) filter, at time t $RPos_t$ Receiver Position coordinates at time t given by ($RX_t$, $RY_t$, $RZ_t$)

$RPos^f_t$ Receiver Position coordinates calculated with the (e.g., Kalman) filter, at time t given by ($RX^f_t$, $RY^f_t$, $RZ^f_t$)

As explained above, during normal operation (i.e., not a GPS-denied situation), a set of four or more GPS satellites is identified, and the receiver position $RPos_{t0}$ and clock bias $T_0$ at time t0 are calculated. Regardless of the time that the receiver has been operating normally, the disclosure below will refer to the last known location and clock bias and they will be denoted by $RPos_{t0}$, and $T_{t0}$, respectively.

The GPS-denied navigation explained below is primarily of use when the receiver is moving. If the receiver is not moving, then it is generally irrelevant if a GPS-denied situation. However, assuming the receiver is moving, for a pre-defined desired accuracy, computing successive new calculated positions of the moving receiver in a GPS-denied situation may be accomplished as explained in further detail below.

In general, current state of the art IMUs are sufficient to compute accurate receiver position if the receiver moves for a small period of time, after which problems with drift make reliance on IMUs alone an unreliable method for calculating precise position information.

The method 100 continues in block 106 with calculating a position for each satellite at the second time—that is, at the time that the receiver position has been determined using data from the non-satellite sensor. In accordance with various embodiments, the goal is to identify the satellites' coordinates that would result in the second position of the receiver. As will be explained in further detail below, these identified or calculated coordinates may then be compared with the known coordinates of the satellites (e.g., based on published tables and almanac-type data), and the second position of the receiver can either be confirmed as accurate if the comparison results in an acceptable difference (i.e., below a particular threshold) or the second position of the receiver may be iteratively modified to reduce the difference between the calculated and known coordinates of the satellites.

In one embodiment, approximate values for pseudo-ranges $PR_{i,t1}$ for i=1, 2, 3, 4 are calculated between the known receiver position at t0 and the satellite positions at t1. Since Equations 1A are only approximate, missing the ionospheric, tropospheric, multi-path and other effects, using the known receiver position at t0 induces minimal error for small increments of time from t0 to t1. The position of each satellite is given in three dimensions, and thus determining the positions of four satellites results in a total of 12 unknown variables that must be solved for. One skilled in the art will appreciate that at least 12 unique equations are needed to solve for these 12 position variables. The following described equations are illustrative, but it should be appreciated that other combinations of unique equations are similarly within the scope of the present disclosure.

Because the pseudo-ranges $PR_{i,t1}$ for i=1, 2, 3, 4 have been estimated, four equations that can be used to find the 3-dimensional position of the satellites include Equations 1A, with the receiver position at time t1, the pseudo-range $PR_{i,t1}$ for i=1, 2, 3, 4 at time t1 and the clock bias known, and with the satellite positions at time t1 as the unknowns. Another four equations are provided by describing the movement of the satellites from time t0 to time t1, where 14000 km/hr. is the approximate travel velocity of the satellites, and Δt is the difference between t1 and t0:

$$(14{,}000 \text{ km/hr.})^* \Delta t = [(SX_{i,t0} - SX_{i,t1})^2 + (SY_{i,t0} - SY_{i,t1})^2 + (SZ_{i,t0} - SZ_{i,t1})^2]^{1/2} \text{ for } i=1,2,3,4 \qquad \text{Equation 2}$$

The final four equations in this embodiment come from calculating the geometric dilution of precision (GDOP), the positional dilution of precision (PDOP), the horizontal dilution of precision (HDOP), and the vertical dilution of precision (VDOP) with the information available for these quantities at time t0. Equations for computing dilution of precision quantities are known in the art and are not be repeated here This set of 12 equations and 12 unknowns is solved iteratively to calculate a position for each satellite at the second time, or t1. Some embodiments may use different approximations, such as neglecting the clock bias error or using an updated clock bias error at time t1 (calculated iteratively using $PR^f_{i,t1}$ for i=1, 2, 3, 4 and the satellite positions at t1).

The method 100 continues in block 108 with comparing the calculated position for each satellite to its known position, based on published trajectories of satellites and the like. Since the calculated position of each satellite is based on mostly known or well-approximated values, differences in the calculated position and the known position can be attributed to error in the determination of receiver position based on data from the non-satellite sensor(s). Thus, in block 110, if the difference in calculated and known positions is within a threshold (i.e., the error is low), then the method 100 continues in block 112 with updating the position to be the determined second position of the receiver. In other words, the determined second position is confirmed as accurate, and can be used as the basis for future position calculations. As such, the method 100 then returns to block 104 where the non-satellite sensor is again used in conjunction with the confirmed position to determine a "new" second position. Of course, should the GPS-denied scenario come to an end, GPS-based position determination may resume.

However, if the difference in calculated and known positions exceeds a threshold (i.e., the error is unacceptably high), then the method 100 continues in block 114 with updating or modifying the second position of the receiver to attempt to reduce the difference in the calculated and known positions of each satellite. Subsequently, the method 100 continues in block 106 where the position of the satellites is recalculated using the updated or modified second position of the receiver. As above, the goal is to identify a receiver position that results in the calculated satellite positions being equal to—or within a threshold of—the known satellite positions. Once this is achieved, the second position is confirmed as accurate. In other words, the difference among the calculated satellite positions and the known satellite positions (e.g., generated using the TLE information) can be used to improve, accelerate, or refine the position determination in GPS-denied scenarios.

A further benefit of the above method 100 is that jamming tactics affecting GPS devices can be mitigated by utilizing the GPS-denied navigation method even in situations where GPS signals are perceived as being available. Similarly, by running the GPS-denied algorithm at all times and comparing its output to the positional determination from the GPS receiver, spoofing and/or other blocking techniques may be readily detected by observing a difference in the position determination from the GPS receiver (i.e., subject to spoofing or obfuscation) and the position determination using the GPS-denied method, which is not susceptible to spoofing or obfuscation. Thus, it is within the scope of the present disclosure that the method 100 not only be utilized in GPS-denied scenarios, but also to prevent against or detect GPS spoofing, jamming, and other similar obfuscation techniques.

In some embodiments, the satellites used for GPS-based position determination at time t0 may differ from those used for the calculations or comparisons at time t1. For example, a different set or a subset of satellites may be selected for use at time t1 based on their DOP qualities (i.e., to reduce dilution). In one such example, assume that six satellites are visible and useable for GPS-based position determination at time t0. However, a first subset of four of the six satellites results in poor DOP while a second subset of four of the six satellites results in an acceptable DOP. In this case, the second subset of four satellites is selected for use in the GPS-denied algorithm to improve DOP characteristics at time t1.

Figure 2:
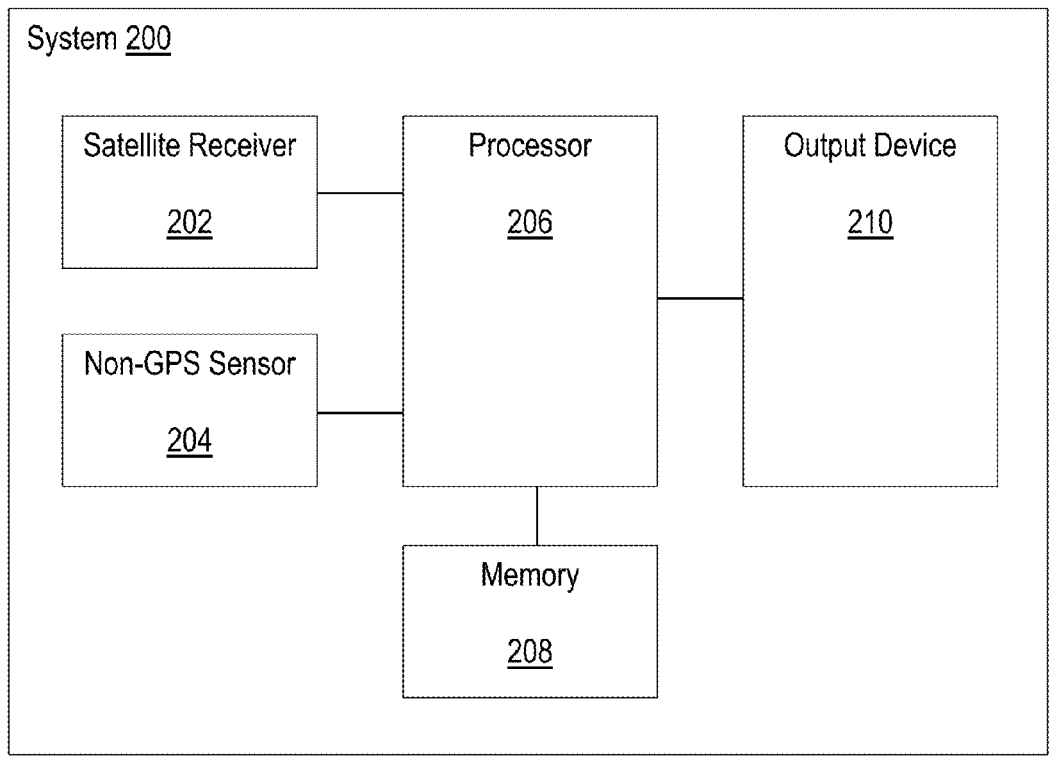
FIG. 2 shows a block diagram of a system in accordance with at least some embodiments of the present disclosure.

FIG. 2 shows a system 200 in accordance with various embodiments. The system 200 may be any GPS-enabled device, including handheld, man-portable, or larger scale devices such as those used on aircraft, automobile, or marine vessels. The system 200 includes a GPS receiver 202 and a non-GPS sensor 204 as data generating devices. As explained above, the non-GPS sensor 204 may be of many times, including an inertial monitoring unit. The processor 206 is configured to receive data from the GPS receiver 202 and the non-GPS sensor 204, and may execute instructions (optionally stored in memory 208) that cause the processor to perform some or all of the above-described method 100. The system 200 may also include an output device 210 to aid in navigation and other system functions as is known in the art. The processor may also execute instructions contained on a non-transitory, computer-readable medium that cause the processor to perform some or all of the above described method 100; this disclosure is intended to encompass all such embodiments.

Figure 3:
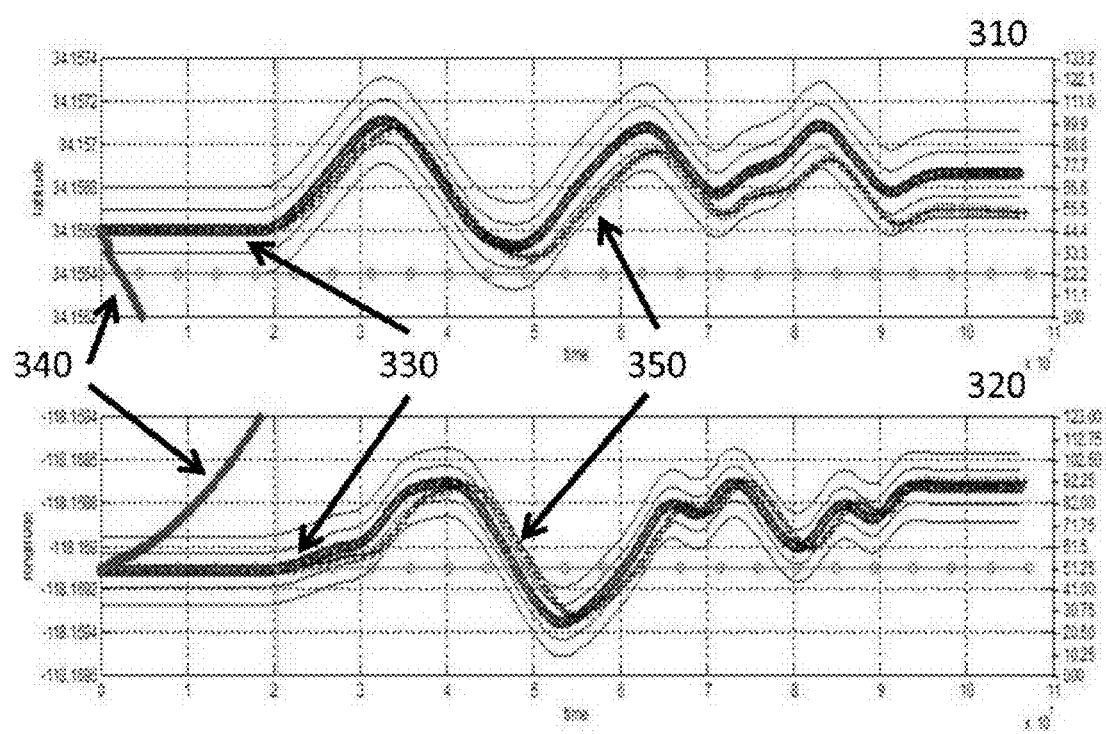
FIG. 3 shows a plot of exemplary results obtained using one embodiment of the present disclosure.

Turning now to FIG. 3, an example of the results obtained with a particular embodiment of this disclosure is shown. As time progresses (represented on the x-axis), the system 200 calculates a receiver position and ranges to the four or more satellites that are correct to within specified accuracy. In accordance with embodiments of this disclosure, the accuracy achieved is greater and remains acceptable for a longer period than that achieved by conventional non-GPS, sensor-based navigation.

In FIG. 3, the y-axis 310 and 320 show latitude and longitude versus time, respectively. The plots 330 are the latitude and longitude provided by GPS-based position determination. The plots 340 represent the receiver position computed using only the IMU data, for example by integrating the IMU data, but not correcting the IMU data with either the GPS satellite data or by the GPS-denied algorithm explained above. As indicated, the plots 340 diverge very quickly, signifying the introduction of substantial error over time. The plots 350 represent the latitude and longitude calculated with an embodiment of the GPS-denied algorithm described here. Although the plots 350 deviate from the GPS-based plots 330, the plots 350 track the GPS-based plots 330 with reduced error. The scale on the left of the graphs is in degrees while the scale on the right displays the equivalent meters to the degrees shown in the scale on the left. The lines that bound the GPS-based plots 330 and the GPS-denied algorithm plots 350 represent a distance of approximately 11 meters per line. These lines are intended to provide a sense of the precision displayed. The length of the plot is approximately 2 hours and 20 minutes.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment", and/or "an embodiment", and/or "a particular embodiment", and/or "some embodiments" indicate that a particular element or characteristic is included in at least one embodiment of the disclosure. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present disclosure. Numerous variations and modifications will become apparent to those skilled in the art once the above disclosure is fully appreciated. For example, GPS satellites and a handheld receiver are described herein, but positioning systems and devices could take any of many suitable forms, or be used in varied applications. It is intended that the following claims be interpreted to embrace all such variations and modifications.

What is claimed is:

1. A method for calculating a position of a receiver, the method comprising:
    determining a first position of the receiver at a first time using data received from satellites;
    determining a second position of the receiver at a second time using the first position and data from a non-satellite sensor;
    calculating the positions of the satellites at the second time;
    comparing, for each satellite, the calculated position with a known position of each satellite at the second time;
    confirming the second position as accurate when a difference between the calculated position and the known position for each satellite is less than a predetermined threshold; and
    correcting the second position based on the comparison of the calculated position and known position for each satellite when the difference between the calculated position and the known position for each satellite is greater than the predetermined threshold.

2. The method of claim 1 further comprising using the confirmed second position as the first position in a subsequent iteration.

3. The method of claim 1 further comprising:
    comparing the confirmed second position with a position of the receiver determined using data from satellites; and identifying a satellite spoofing event if a difference between the confirmed second position and the position determined using data from satellites is greater than a predetermined threshold.

4. The method of claim 1 wherein the satellites comprise global positioning system (GPS) satellites.

5. A system comprising:
a processor;
a satellite receiver coupled to the processor;
a non-satellite sensor coupled to the processor; and
a memory coupled to the processor, the memory storing a program that, when executed by the processor, causes the processor to:
   determine a first position of the system at a first time using data of multiple satellites generated by the satellite receiver;
   determine a second position of the system at a second time using the first position and data generated by the non-satellite sensor;
   calculate the positions of the satellites associated with at the second time;
   compare, for each satellite, the calculated position with a known position of each satellite at the second time;
   confirm the second position as accurate when a difference between the calculated position and the known position for each satellite is less than a predetermined threshold; and
   correct the second position based on the comparison of the calculated position and known position for each satellite when the difference between the calculated position and the known position for each satellite is greater than the predetermined threshold.

6. The system of claim 5 wherein the processor is further configured to use the confirmed second position as the first position in a subsequent iteration.

7. The system of claim 5 wherein the processor is further configured to:
   compare the confirmed second position with a position of the satellite receiver determined using data from the satellites; and
   identify a satellite spoofing event if a difference between the confirmed second position and the position determined using data from satellites is greater than a predetermined threshold.

8. The system of claim 7 wherein when the processor identifies the spoofing event, the processor is configured to generate an indication of the spoofing event on a display.

9. The system of claim 5 where the satellites comprise global positioning system (GPS) system satellites.

10. A non-transitory, computer-readable medium containing instructions that, when executed by a processor, cause the processor to:
   determine a first position of the system at a first time using data of multiple satellites received from the satellites;
   determine a second position of the system at a second time using the first position and data generated by a non-satellite sensor coupled to the processor;
   calculate the positions of the satellites associated with at the second time;
   compare, for each satellite, the calculated position with a known position of each satellite at the second time;
   confirm the second position as accurate when a difference between the calculated position and the known position for each satellite is less than a predetermined threshold; and
   correct the second position based on the comparison of the calculated position and known position for each satellite when the difference between the calculated position and the known position for each satellite is greater than the predetermined threshold.

11. The non-transitory, computer-readable medium of claim 10 wherein the processor uses the confirmed second position as the first position in a subsequent iteration.

12. The non-transitory, computer-readable medium of claim 10 wherein the processor is further configured to:
   compare the confirmed second position with a position of a receiver coupled to the processor, wherein the position of the receiver is determined using data from the satellites; and
   identify a satellite spoofing event if a difference between the confirmed second position and the position determined using data from satellites is greater than a predetermined threshold.

13. The non-transitory, computer-readable medium of claim 12 wherein when the processor identifies the spoofing event, the processor generates an indication of the spoofing event on a display.

* * * * *